United States Patent
Cain

(10) Patent No.: US 9,594,199 B2
(45) Date of Patent: Mar. 14, 2017

(54) PIXELLATED DISPLAY DEVICES

(75) Inventor: Paul Cain, Hertfordshire (GB)

(73) Assignee: FLEXENABLE LIMITED, Cambridge (GB)

( * ) Notice: Subject to any disclaimer, the term of this patent is extended or adjusted under 35 U.S.C. 154(b) by 176 days.

(21) Appl. No.: 14/115,147

(22) PCT Filed: May 11, 2012

(86) PCT No.: PCT/EP2012/058726
§ 371 (c)(1),
(2), (4) Date: Nov. 1, 2013

(87) PCT Pub. No.: WO2012/152907
PCT Pub. Date: Nov. 15, 2013

(65) Prior Publication Data
US 2014/0071557 A1    Mar. 13, 2014

(30) Foreign Application Priority Data

May 11, 2011 (GB) .................................. 1107866.4

(51) Int. Cl.
*G02B 5/22* (2006.01)
*G02B 5/20* (2006.01)
(Continued)

(52) U.S. Cl.
CPC ........... *G02B 5/201* (2013.01); *G02F 1/1333* (2013.01); *G02F 1/133514* (2013.01);
(Continued)

(58) Field of Classification Search
CPC .......... G02B 5/201; G02B 5/22; G02B 5/285; G02B 5/20; G02B 5/223; G02B 1/04;
(Continued)

(56) References Cited

U.S. PATENT DOCUMENTS 4,906,552 A    3/1990  Ngo et al.
5,146,355 A *  9/1992  Prince ............... G02F 1/133617
                                                        349/106
(Continued)

FOREIGN PATENT DOCUMENTS

CN      1453618 A    11/2003
CN    101546076 A     9/2009
(Continued)

OTHER PUBLICATIONS

Azar Maalouf et al., "An improvement in standard photolithography resolution based on Kirchhoff diffraction studies," J. Phys. D: Appl. Phys., 2009, pp. 1-11, vol. 42, No. 1.
(Continued)

*Primary Examiner* — Bumsuk Won
*Assistant Examiner* — Balram Parbadia
(74) *Attorney, Agent, or Firm* — Sughrue Mion, PLLC

(57) ABSTRACT

A method of producing plural pixellated display devices, each having a first component comprising an array of independently controllable pixel electrodes; and a second component comprising an array of pixel filters comprising different types of pixel filters of differing optical transmission characteristics, each pixel filter being associated with a respective one of said pixel electrodes. The first component has some distortion within the array of pixel electrodes causing a variation in pixel electrode pitch between different regions of the array. The second component is applied to the first component to provide misalignment between an alignment reference position on the first component and an alignment reference position on the second component. An array of pixel filters is formed in a neutral framework having a separation distance between each pixel filter that prevents any pixel filter of the array of pixel filters overlapping with more than one of said pixel electrodes.

10 Claims, 4 Drawing Sheets

(51) Int. Cl.
*G02F 1/1333* (2006.01)
*G02F 1/1335* (2006.01)
*G02F 1/1362* (2006.01)

(52) U.S. Cl.
CPC .............. *G02F 1/133512* (2013.01); *G02F 2001/133354* (2013.01); *G02F 2001/136222* (2013.01); *Y10T 29/49002* (2015.01)

(58) Field of Classification Search
CPC .............. G02B 1/105; G02F 1/133514; G02F 1/133516; G02F 1/133512; G02F 1/167; G02F 1/133509; G02F 1/134309; G02F 2001/136222
See application file for complete search history.

(56) References Cited

U.S. PATENT DOCUMENTS

| | | |
|---|---|---|
| 6,414,732 B1 | 7/2002 | Matsumoto et al. |
| 6,624,860 B1 * | 9/2003 | Narutaki ............. G02B 5/201 349/106 |
| 2003/0202138 A1 * | 10/2003 | Nakamura .................. 349/113 |
| 2005/0007526 A1 | 1/2005 | Lim |
| 2005/0057712 A1 | 3/2005 | Katagami et al. |
| 2011/0049661 A1 | 3/2011 | Maehara et al. |
| 2011/0051056 A1 | 3/2011 | Li et al. |

FOREIGN PATENT DOCUMENTS

| | | |
|---|---|---|
| JP | 62-109002 A | 5/1987 |
| JP | 2003-066466 A | 3/2003 |
| JP | 2008-134592 A | 6/2008 |
| KR | 10-2004-0110834 A | 12/2004 |

OTHER PUBLICATIONS

International Search Report of PCT/EP2012/058726 dated Jun. 26, 2012.
British Search Report of GB 1107866.4 dated Aug. 20, 2012.
Office Action issued in corresponding Chinese Patent Application No. 201280022322.5 dated Jun. 20, 2016.

* cited by examiner

PIXELLATED DISPLAY DEVICES

CROSS REFERENCE TO RELATED APPLICATIONS

This application is a National Stage of International Application No. PCT/EP2012/058726 filed May 11, 2012, claiming priority based on British Patent Application No. 1107866.4, filed May 11, 2011, the contents of all of which are incorporated herein by reference in their entirety.

Pixellated display devices comprise a display media of which respective pixel portions can have their optical properties independently adjusted by a respective pixel electrode of an underlying array of independently controllable pixel electrodes.

Some pixellated display devices include an array of optical filters arranged over the array of pixel electrodes, with each optical filter associated with a respective pixel electrode. The array of optical filters includes two or more different types of optical filters, whereby the number of different possible optical output configurations of a group of pixels of the display can be increased.

Such pixellated devices are typically produced by producing a first component comprising the array of independently controllable pixel electrodes, and applying a second component defining the array of optical filters to the first component with careful alignment of the two components.

The inventors have observed that for pixellated display devices of this kind produced by some methods, there can be a problem of variation in the quality of the optical output between devices and also between regions in a single device. The inventors have attributed this variation in the quality of optical output to distortions in the pixel electrode array, and have identified the challenge of providing a solution to this problem.

There is hereby provided a method of producing a plurality of pixellated display devices, each device including a first component comprising an array of independently controllable pixel electrodes; and a second component comprising an array of pixel filters comprising at least two different types of pixel filters of differing optical transmission characteristics, each pixel filter being associated with a respective one of said pixel electrodes; wherein the method comprises: producing said first component by a production method that inevitably results in some distortion within the array of pixel electrodes causing up to a maximum degree of variation in pixel electrode pitch between different regions of said array of pixel electrodes; applying said second component to said first component by a technique that can result in up to a maximum degree of misalignment between an alignment reference position on the first component and an alignment reference position on the second component; and configuring said array of pixel filters as an array of pixel filters in a neutral framework, said neutral framework defining a separation distance between each pixel filter that is sufficiently large to prevent any pixel filter of the array of pixel filters overlapping with more than one of said pixel electrodes even with said maximum variation in pixel electrode pitch between different regions of said array of pixel electrodes and with said maximum degree of misalignment between said alignment reference position on the first component and said alignment reference position on the second component.

In one embodiment, said pixel filters comprise pixel filters of three different colours, and said neutral framework transmits all wavelengths of light in the visible spectrum with substantially the same transmittance.

In one embodiment, said neutral framework exhibits a transmittance over the visible spectrum greater than the transmittance over the visible spectrum of the pixel filters.

In one embodiment, said neutral framework exhibits a transmittance over the visible spectrum less than the transmittance over the visible spectrum of the pixel filters.

In one embodiment, the pixel filters and neutral framework define a recurring pattern in which the area of the pixel filters is no greater than about 85% of the sum of (i) the area of the pixel filters and (ii) the area of the neutral framework.

In one embodiment, the pixel filters and neutral framework define a recurring pattern in which the area of the pixel filters is between about 50% and 85% of the sum of (i) the area of the pixel filters and (ii) the area of the neutral framework.

In one embodiment, the first component includes a plastic substrate.

There is also hereby provided the use of a neutral framework in a pixel filter array for the purpose of compensating for variations in pixel pitch between different regions of an array of pixel electrodes An embodiment of the invention is described hereunder in detail, by way of example only, with reference to the accompanying drawings, in which.

An embodiment of the invention is described hereunder for the example of a liquid crystal colour display controlled by an array of top-gate thin-film transistors (TFTs) via an array of pixel electrodes. However, the same techniques are also useful in other devices including an array of optical filters associated with an array of pixel electrodes.

Figure 1:
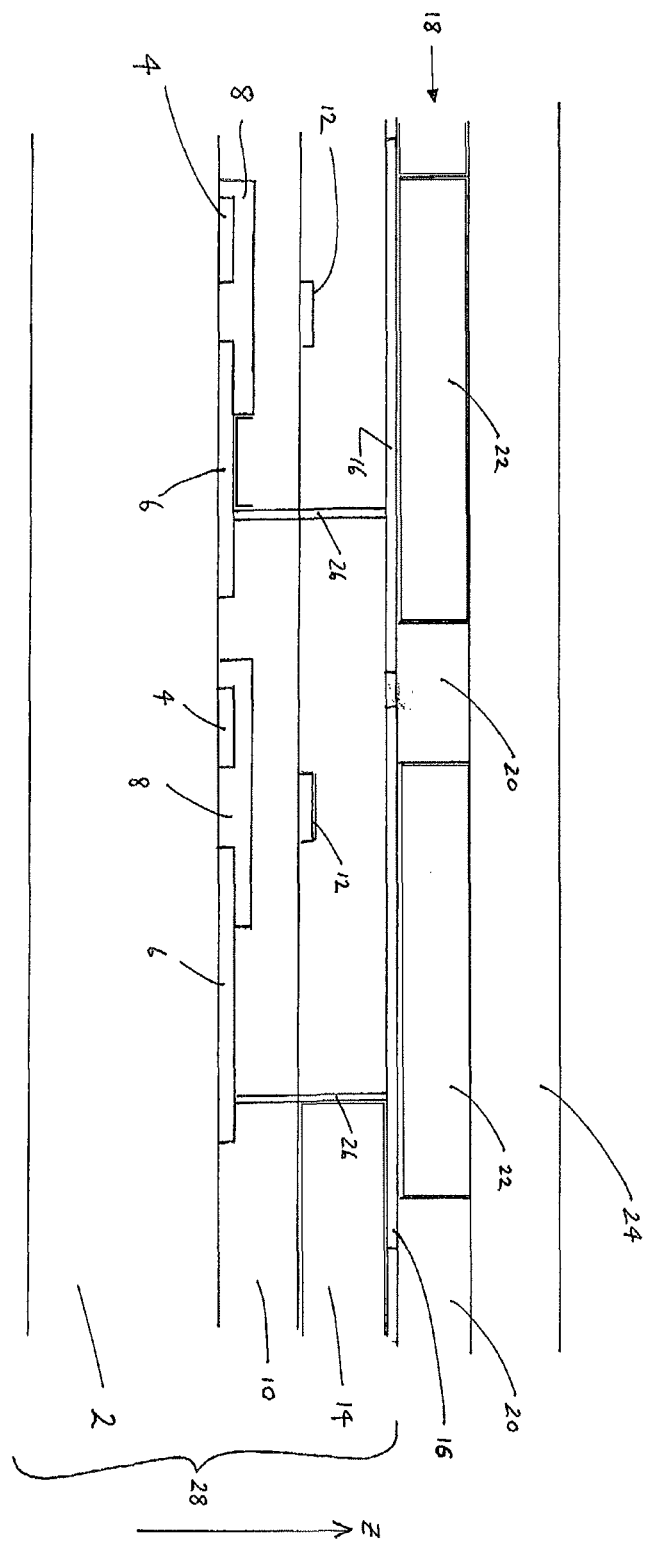
FIG. 1 illustrates an example of a device including an array of optical filters interposed between a display media and an array of pixel electrodes.
Figure 2:
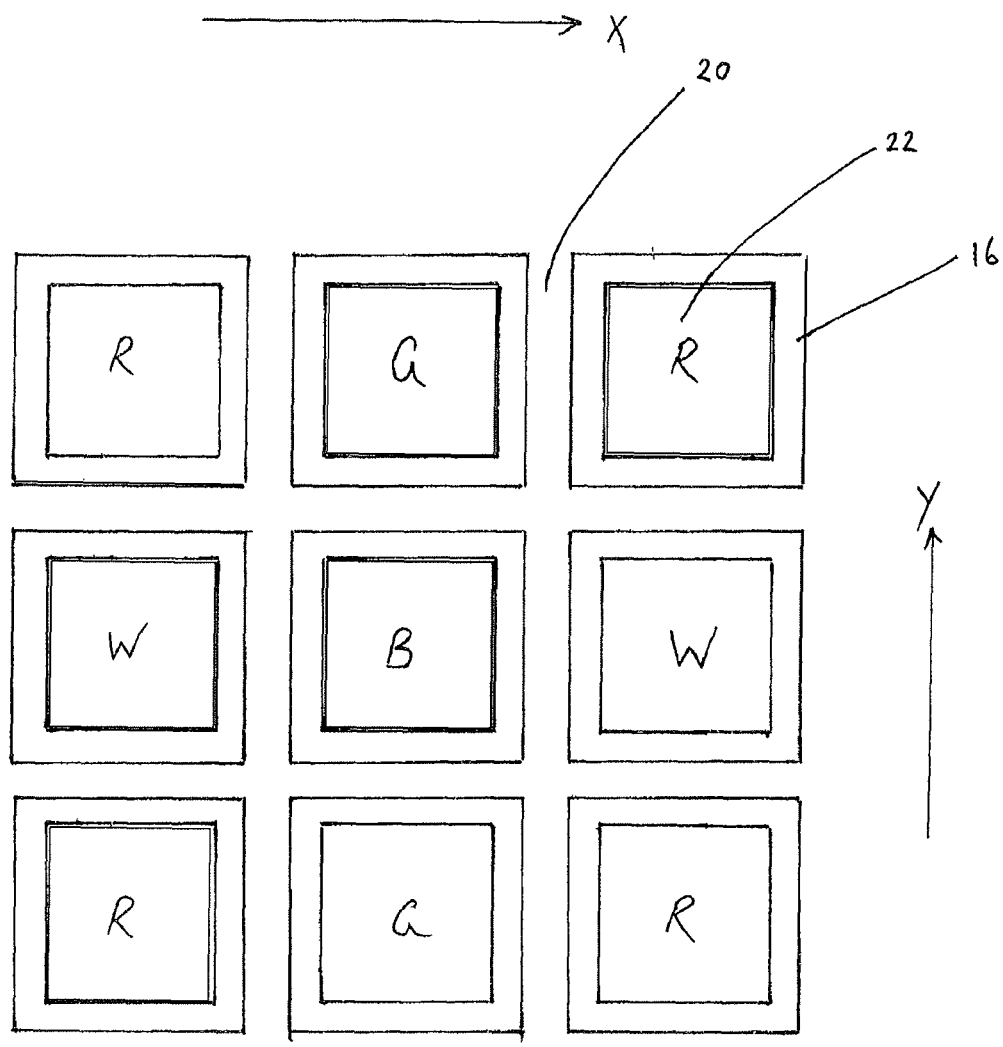
FIG. 2 illustrates an example of an optical filter component used in an embodiment of the present invention.
Figure 3:
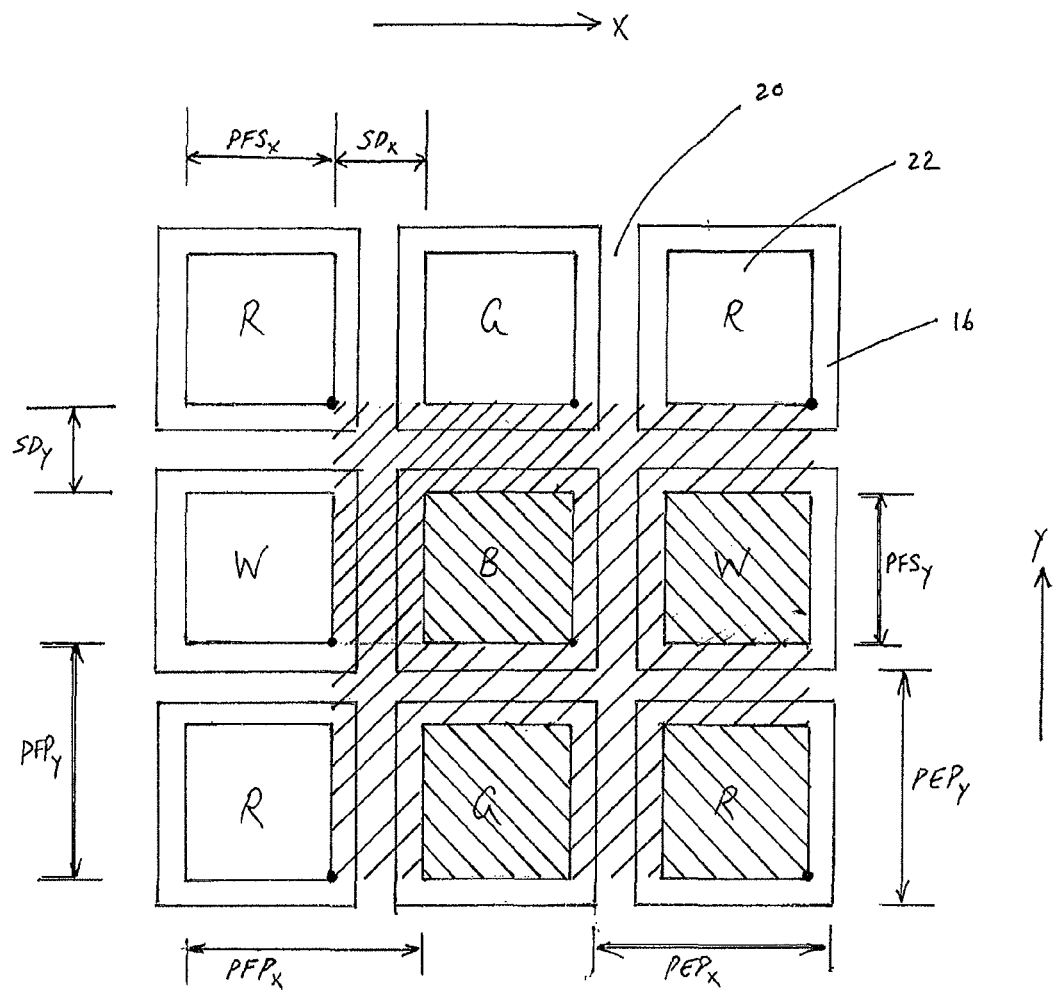
FIG. 3 illustrates the x-y dimensions and recurring pattern of the optical filter component of FIG. 2.
Figure 4:
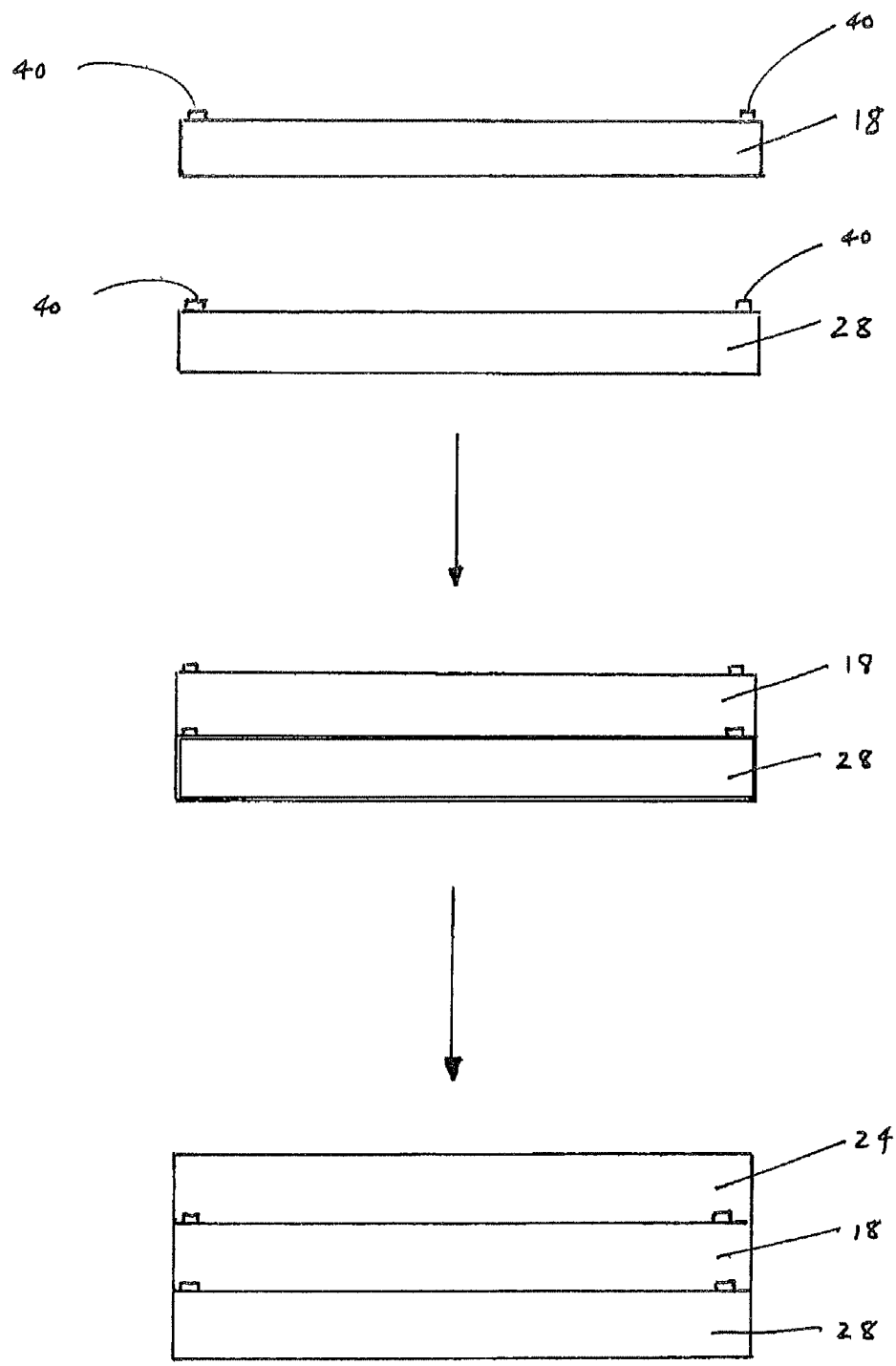
FIG. 4 illustrates a technique for producing the device of FIG. 1.

With reference to FIGS. 1 to 3, a display device comprises a colour filter component 18 interposed between a display media 24 and a control component 28. With reference to FIG. 4, the display device is produced by laminating colour filter component 18 to the upper surface of control component 28 with the aim of achieving alignment between alignment marks 40 on the two components in the resulting laminated product. The display media 24 is then laminated to the upper surface of the colour filter component 18 to complete the device.

The control component comprises: a plastic substrate 2; a first patterned conductive layer defining source electrodes 4 and drain electrodes 6 for an array of TFTs and addressing lines (not shown) for addressing the source electrodes 4; a patterned semiconductive layer defining a respective semiconductor channel 8 between each pair of source and drain electrodes; gate electrodes 12 capacitatively coupled to the semiconductor channels 8 via a gate dielectric region 10; an array of pixel electrodes 16 separated from the underlying circuitry by an electrically insulating region 18 and each conductively connected to a respective drain electrode via an interlayer conductive connect 26.

The colour filter component 18 comprises an ordered array of white, green, red and blue filters 22 arranged in a recurring pattern within an optically neutral framework 20. FIGS. 2 and 3 illustrate the theoretically ideal case where the centre of each individual colour filter 22 of the colour filter component 18 is perfectly aligned with the centre of each pixel electrode 16.

The dimensions $PFS_x$ and $PFS_y$ of the colour filters 22 and the dimensions $SD_x$ and $SD_y$ of the optically neutral framework 20 are selected relative to the pixel electrode pitch $PEP_x$, $PEP_y$ of the array of pixel electrodes 16 taking into account the maximum amount by which the centre of an individual colour filter 22 is expected to deviate from the centre of the respective pixel electrode 16 as a result of distortions in the array of pixel electrodes and the limited degree of accuracy to which one or more reference points of the colour filter component 18 can be aligned to one or more corresponding reference points of the control component 28 in the process of laminating the colour filter component 18 to the control component 28. The above-mentioned dimensions of the colour filters 22 and the neutral framework 20 are selected such that there is no risk of any individual colour filter 22 overlapping with more than one pixel electrode 16 even with the highest amount of distortion that can be expected within the array of pixel electrodes as a result of the production process and the highest degree of alignment inaccuracy that can be expected to result from the process of laminating the colour filter component 18 to the control component 28.

According to one example: (a) the array of pixel electrodes is an array of square pixel electrodes with a pixel electrode pitch $PEP_x$, $PEP_y$ of 120 microns; (b) the pixel electrode pitch is expected to vary by up to ±3 microns between different regions of the control component 28 because of random distortions caused by the process of producing the control component 28 (i.e. the process of producing the control component 28 can be expected to result in a deviation of up to ±3 microns of the centre of any individual pixel electrode from its respective nominal or theoretical location); and (c) the process of laminating the colour filter component 18 to the control component 28 results in a deviation of up to ±3 microns away from ideal alignment of the alignment marks 40 on the control component 28 to the alignment marks on the colour filter component 18, because of e.g. distortions in the colour filter component 18 and/or control component 28 caused by the lamination process. For this example, the square colour filters 22 have a pitch ($PFP_x$, $PFP_y$) the same as that of the pixel electrodes 16 (i.e. 120 microns), and colour filter dimensions ($PFS_x$ and $PFS_y$) of [120−(4×3)] microns, i.e. 108 microns. In this example, the colour filter component 18 defines a recurring pattern such as that shown in FIG. 3, in which (i) the area occupied by colour filters 22 is about 81% of the sum of (i) the area occupied colour filters 22 and (ii) the area occupied by optical neutrally framework 20.

For processes where the ranges of the above-mentioned distortions and deviations are larger, the percentage area occupied by colour filters 22 in the recurring pattern will be smaller. For some processes, the area occupied by the colour filters 22 in the recurring pattern may be about 54% or about 68% of the sum of (i) the area occupied colour filters 22 and (ii) the area occupied by optical neutrally framework 20 in the recurring pattern.

The technique described above provides uniformity of colour performance between regions within a single device and between devices regardless of the degree to which distortion is exhibited in the array of pixel electrodes 16 as a result of the production process.

In one example, the optically neutral framework 20 is one which transmits all wavelengths of light in the visible spectrum at a substantially uniform transmittance that is higher than the transmittance of any of the colour filters 22 across the same visible spectrum. The use of such a clear framework has the benefit of increasing brightness uniformly across the display for a given electrical input.

In another example, the optically neutral framework 20 is one which exhibits substantially zero transmittance for all wavelengths of light in the visible spectrum. For conciseness, we shall refer to such a framework as a black framework. The use of such a black framework has the benefit of maximising the capability to produce saturated colours (green, red or blue).

The above described technique is of particular use in devices including control circuitry and pixel electrodes fabricated on plastic substrates. Plastic substrates can be particularly susceptible to unpredictable distortion occurring under the high temperature and high humidity conditions associated with efficient production processes. The distortion (i.e. dimensional changes) may be different for each axis of the substrate.

The present invention is not limited to the foregoing examples. Aspects of the present invention include all novel and/or inventive aspects of the concepts described herein and all novel and/or inventive combinations of the features described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
    producing a first component comprising an array of independently controllable pixel electrodes by a production method that inevitably results in some distortion within the array of pixel electrodes causing up to a maximum degree of variation in pixel electrode pitch between different regions of said array of pixel electrodes;
    providing a second component, wholly separate from the first component and comprising an array of pixel filters in a neutral framework, wherein the array of pixel filters comprises at least two different types of pixel filters of differing optical transmission characteristics;
    laminating said array of pixel filters and said neutral framework of said second component to said first component in a single lamination step by a technique that results in up to a maximum degree of misalignment between an alignment reference position on the first component and an alignment reference position on the second component;
    wherein each pixel filter of the second component is associated with a respective one of said pixel electrodes; and
    wherein said neutral framework defines a separation distance between each pixel filter that is sufficiently large to prevent any pixel filter of the array of pixel filters overlapping with more than one of said pixel electrodes even with said maximum variation in pixel electrode pitch between different regions of said array of pixel electrodes and with said maximum degree of misalignment between said alignment reference position on the first component and said alignment reference position on the second component.

2. A method according to claim 1, wherein said pixel filters comprise pixel filters of three different colours, and said neutral framework transmits all wavelengths of light in the visible spectrum with substantially the same transmittance.

3. A method according to claim 2, wherein said neutral framework exhibits a transmittance over the visible spectrum greater than the transmittance over the visible spectrum of the pixel filters.

4. A method according to claim 2, wherein said neutral framework exhibits a transmittance over the visible spectrum less than the transmittance over the visible spectrum of the pixel filters.

5. A method according to claim 1, wherein the pixel filters and neutral framework define a recurring pattern in which the area of the pixel filters is no greater than about 85% of the sum of (i) the area of the pixel filters and (ii) the area of the neutral framework.

6. A method according to claim 1, wherein the pixel filters and neutral framework define a recurring pattern in which the area of the pixel filters is between about 50% and 85% of the sum of (i) the area of the pixel filters and (ii) the area of the neutral framework.

7. A method according to claim 1, wherein the first component includes a plastic substrate.

8. A method according to claim 1, wherein said neutral framework exhibits a uniform transmittance all around each pixel filter.

9. A method according to claim 1, wherein said neutral framework exhibits a transmittance greater than the transmittance of the pixel filters all around each pixel filter.

10. A method according to claim 1, wherein said neutral framework exhibits a transmittance less than the pixel filters all around each pixel filter.

* * * * *